(12) United States Patent
Hu

(10) Patent No.: US 11,304,214 B2
(45) Date of Patent: Apr. 12, 2022

(54) COMMUNICATION METHOD FOR A COMMUNICATION DEVICE, ELECTRONIC DEVICE, AND STORAGE MEDIUM

(71) Applicant: BOE TECHNOLOGY GROUP CO., LTD., Beijing (CN)

(72) Inventor: Kejun Hu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 191 days.

(21) Appl. No.: 16/435,953

(22) Filed: Jun. 10, 2019

(65) Prior Publication Data

US 2020/0015242 A1 Jan. 9, 2020

(30) Foreign Application Priority Data

Jul. 3, 2018 (CN) .......................... 201810716782.7

(51) Int. Cl.
*H04W 72/12* (2009.01)
*H04B 1/713* (2011.01)
(Continued)

(52) U.S. Cl.
CPC .......... *H04W 72/121* (2013.01); *H04B 1/713* (2013.01); *H04W 72/0446* (2013.01); *H04W 72/10* (2013.01)

(58) Field of Classification Search
None
See application file for complete search history.

(56) References Cited

U.S. PATENT DOCUMENTS 5,528,622 A * 6/1996 Cadd ...................... H04B 1/715
370/447
9,271,170 B1 * 2/2016 Loverich ............. H04W 52/262
(Continued)

FOREIGN PATENT DOCUMENTS

CN 2697955 Y 5/2005
CN 1717076 A 1/2006
(Continued)

OTHER PUBLICATIONS

First Chinese Office Action in Chinese Patent Application No. 201810716782.7 dated Nov. 27, 2020.

*Primary Examiner* — Noel R Beharry
*Assistant Examiner* — Rodrick Mak
(74) *Attorney, Agent, or Firm* — Dilworth & Barrese, LLP.; Michael J. Musella, Esq.

(57) ABSTRACT

Disclosed are a communication method of a communication device, an electronic device, and a storage medium, the communication method includes: constructing a target group, wherein the target group includes the communication device and at least one other communication device, and each communication device in the target group sequentially transmits a message on a communication frequency point of the target group; determining a priority of the communication device in the target group, and determining a transmission time slot corresponding to the priority according to the priority; transmitting data message in the transmission time slot, and receiving data message at a time other than the transmission time slot. With the communication method, the electronic device and the storage medium provided by the present disclosure, communication can be implemented in a relatively convenient and economical way.

19 Claims, 8 Drawing Sheets

(51) Int. Cl.
*H04W 72/04* (2009.01)
*H04W 72/10* (2009.01)

(56) References Cited

U.S. PATENT DOCUMENTS

| | | | | |
|---|---|---|---|---|
| 2008/0310340 A1* | 12/2008 | Isozu | ............ | H04L 45/10 370/328 |
| 2010/0009708 A1* | 1/2010 | Horio | ............ | H04W 4/10 455/518 |
| 2012/0224608 A1* | 9/2012 | Yun | ............ | H04L 5/0044 375/134 |
| 2013/0202013 A1* | 8/2013 | Van Stralen | ...... | H04W 72/02 375/133 |
| 2015/0043541 A1* | 2/2015 | Blankenship | ...... | H04W 72/02 370/336 |
| 2015/0046580 A1* | 2/2015 | Sasagawa | ........ | H04L 41/0816 709/224 |
| 2015/0117340 A1* | 4/2015 | Kawakami | .......... | G06F 21/74 370/329 |
| 2015/0215811 A1* | 7/2015 | Smadi | ............ | H04W 52/18 370/230 |
| 2015/0223029 A1* | 8/2015 | Kanno | ............ | H04W 4/08 370/254 |
| 2015/0341130 A1* | 11/2015 | Zhou | ............ | H04W 28/26 370/336 |
| 2016/0212594 A1* | 7/2016 | Morita | ............ | H04W 4/06 |
| 2016/0212742 A1* | 7/2016 | Zhang | ............ | H04W 76/10 |
| 2016/0360548 A1* | 12/2016 | Nguyen | ............ | H04W 4/08 |
| 2017/0094602 A1 | 3/2017 | Dinh et al. | | |
| 2017/0303291 A1* | 10/2017 | Chae | ............ | H04W 72/12 |
| 2020/0169429 A1* | 5/2020 | Suzuki | ............ | H04W 4/38 |

FOREIGN PATENT DOCUMENTS

| | | |
|---|---|---|
| CN | 1901699 A | 1/2007 |
| CN | 1921646 A | 2/2007 |
| CN | 103096258 A | 5/2013 |
| CN | 103945403 A | 7/2014 |
| CN | 204650150 U | 9/2015 |
| CN | 204721344 U | 10/2015 |
| CN | 105072587 A | 11/2015 |
| CN | 206402216 U | 8/2017 |
| CN | 107548035 A | 1/2018 |
| EP | 32976302 A1 | 3/2018 |

\* cited by examiner

COMMUNICATION METHOD FOR A COMMUNICATION DEVICE, ELECTRONIC DEVICE, AND STORAGE MEDIUM

The present disclosure claims priority of Chinese Patent Application No. 201810716782.7 as filed on Jul. 3, 2018, the entire disclosure of which is hereby incorporated by reference as a part of the present disclosure.

TECHNICAL FIELD

The present disclosure relates to the field of communication technique, and more particularly, to a communication method for a communication device, an electronic device and a storage medium.

BACKGROUND

People can make long-distance calls in daily life with the use of telephone, mobile phone, WeChat, interphone, and the like. The communication distance of the first three manners are unlimited, but people need to continuously pay call charge or data traffic fee to the operator; the interphone adopts the open ISM430-470 MHz frequency band, its disadvantage is that it usually only supports half-duplex voice communication, it is bulky (due to the large antenna) and is not convenient to carry.

In life there are often scenes that need to communicate within a certain range, for example, high-frequency calls when patrolling in industrial parks, supermarkets, shopping malls etc. and high-frequency calls when family members and friends travel together etc.; in these scenes, it is obviously uneconomical to use telephone, mobile phone and WeChat, and the interphone requires to press the PTT (Push-to-Talk) button to make a call, and its large size brings inconvenience in use. In particular, the above communication tools are not suitable for children to operate and use.

SUMMARY

In view of the above, one of the objectives of the embodiments of the present disclosure is to provide a communication method for a communication device, an electronic device and a storage medium, which can enable convenient and economical communication.

Based on the above objective, according to a first aspect of the embodiments of the present disclosure, there is provided a communication method for a communication device, the communication method including: constructing a target group, wherein the target group includes the communication device and at least one other communication device, and each communication device in the target group sequentially transmits a message on a communication frequency point of the target group; determining a priority of the communication device in the target group, and determining a transmission time slot corresponding to the priority according to the priority; transmitting data message in the transmission time slot, and receiving data message at a time other than the transmission time slot.

In some embodiments, constructing the target group includes: determining whether the target group has been established by listening-in, during a preset listening-in time period, on a preset frequency point; if the target group has not been established, establishing the target group on a first target frequency point; if the target group has been established, determining a second target frequency point on which the target group has been established, and joining the target group.

In some embodiments, establishing the target group includes: determining the first target frequency point; transmitting, on the first target frequency point, a first group message at a preset time interval, wherein the first group message includes a first group information and a first parameter, the first parameter is related to the priority; receiving, on the first target frequency point, at least one second group message, wherein the second group message includes a second group information and a second parameter, the second parameter is related to the priority.

In some embodiments, joining the target group includes: determining whether a number of existing communication devices in the target group reaches a preset number of terminals; if the number of existing communication devices in the target group does not reach the preset number of terminals, joining the target group.

In some embodiments, the first group information includes an identifier of the target group; the second group information includes an identifier of the target group and a device address of a communication device subordinate to the target group.

In some embodiments, determining the priority of the communication device in the target group and determining the transmission time slot corresponding to the priority according to the priority including: comparing the first parameter and the second parameter; determining the priority of the communication device in the target group according to a comparison result; determining the transmission time slot based on the priority.

In some embodiments, determining the priority of the communication device in the target group and determining the transmission time slot corresponding to the priority according to the priority including: setting the priority of the communication device to be lower than the priority of other communication devices in the target group; determining the transmission time slot based on the priority.

In some embodiments, transmitting a data message in the transmission time slot includes: obtaining a to-be-transmitted data information; transmitting the to-be-transmitted data information to a transmitting queue; extracting a data information of a preset length from the transmitting queue and transmitting the data information of the preset length in the transmission time slot.

In some embodiments, receiving the data message at a time other than the transmission time slot includes: receiving the data information from other communication devices in the target group; buffering the data information from other communication devices in the target group to a receiving queue corresponding to a respective communication device; exerting a superimposing operation on all the data information and storing the superimposed data information in an output buffering queue; sequentially outputting the superimposed data information.

In some embodiments, the communication method further includes: determining, according to the priority, one communication device in the target group as a master device, and determining other communication devices in the target group other than the master device as slave devices.

In some embodiments, an expression for determining the transmission time slot corresponding to the priority according to the priority is:

$$t_r = \frac{b_A * T_s}{b_P} + \frac{n * T_s}{m},$$

where $t_r$ is a moment at which the data message of the master device is received, $T_s$ is a communication cycle; $b_A$ is a data encoding rate; $b_P$ is an air interface data transmission rate; n is the priority of the communication device, and m is the preset number of terminals in the target group.

In some embodiments, if the communication device is the master device, the communication method further includes: calculating a group communication success rate according to a data message transmitted and received in the target group, the data message including a third parameter indicative of a quantity of successful data reception; if the group communication success rate is lower than a preset communication success rate threshold, transmitting a frequency hopping message in the target group, the frequency hopping message including a frequency hopping point; receiving a frequency hopping response message from other communication device in the target group; if the frequency hopping response message of each of all the other communication devices in the target group has been received, stopping the transmission of the frequency hopping message and switching to the frequency hopping point.

In some embodiments, if the communication device is the slave device, the communication method further includes: receiving a frequency hopping message indicative of a frequency hopping point from the master device; transmitting a frequency hopping response message; switching to the frequency hopping point.

According to a second aspect of the embodiments of the present disclosure, there is provided an electronic device, including: at least one processor; and a memory, which is communicatively coupled to the at least one processor, wherein the memory stores instructions executable by the at least one processor, execution of the instructions by the at least one processor enables the electronic device to perform an operation, including: constructing a target group, wherein the target group includes the communication device and at least one other communication device, and each communication device in the target group sequentially transmits a message on a communication frequency point of the target group; determining a priority of the communication device in the target group, and determining a transmission time slot corresponding to the priority according to the priority; transmitting a data message in the transmission time slot, and receiving a data message at a time other than the transmission time slot.

In some embodiments, constructing the target group includes: determining whether the target group has been established by listening-in, during a preset listening-in time period, on a preset frequency point; if the target group has not been established, establishing the target group on a first target frequency point; if the target group has been established, determining a second target frequency point on which the target group has been established, and joining the target group.

In some embodiments, determining the priority of the communication device in the target group, and determining the transmission time slot corresponding to the priority include: comparing the first parameter and the second parameter; determining the priority of the communication device in the target group according to a comparison result; determining the transmission time slot based on the priority.

In some embodiments, transmitting the data message in the transmission time slot includes: obtaining a to-be-transmitted data information; transmitting the to-be-transmitted data information to a transmitting queue; extracting a data information of a preset length from the transmitting queue and transmitting the data information of the preset length in the transmission time slot.

According to a third aspect of the embodiments of the present disclosure, there is provided a computer-readable storage medium storing a computer program, wherein the computer program, when executed by a processor, implements: constructing a target group, wherein the target group includes the communication device and at least one other communication device, and each communication device in the target group sequentially transmits a message on a communication frequency point of the target group; determining a priority of the communication device in the target group, and determining a transmission time slot corresponding to the priority according to the priority; transmitting a data message in the transmission time slot, and receiving a data message at a time other than the transmission time slot.

In some embodiments, constructing the target group includes: determining whether the target group has been established by listening-in, during a preset listening-in time period, on a preset frequency point; if the target group has not been established, establishing the target group on a first target frequency point; if the target group has been established, determining a second target frequency point on which the target group has been established, and joining the target group.

BRIEF DESCRIPTION OF THE DRAWINGS

In order to more clearly illustrate the technical solutions in the embodiments of the present disclosure, drawings necessary for describing the embodiments will be briefly introduced below, obviously, the drawings described below only relate to some embodiments of the present disclosure, they are not limitations to the present disclosure.

DETAILED DESCRIPTION OF THE EMBODIMENTS

Figure 1A:
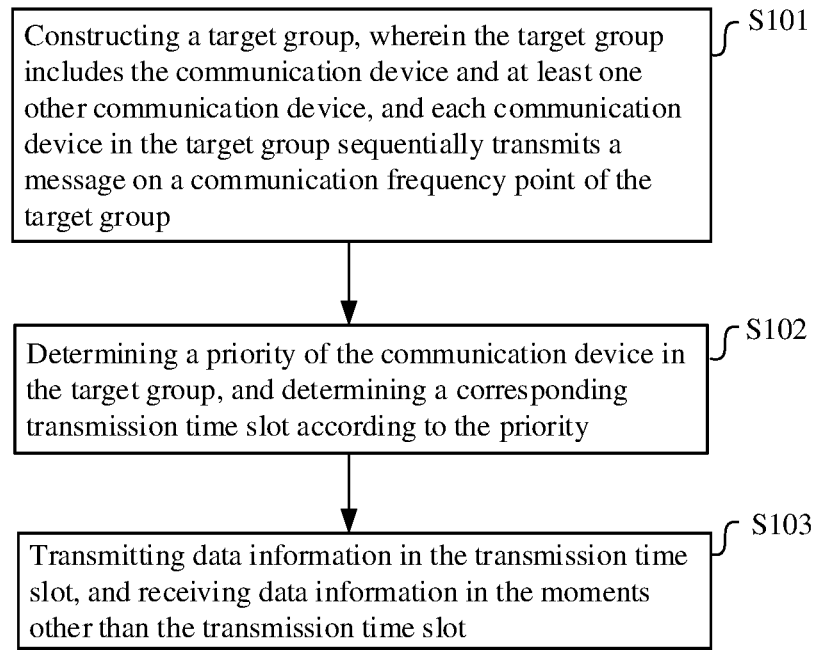
FIG. 1A shows a schematic flow diagram of a communication method according to an embodiment of the present disclosure.

Various embodiments in accordance with the present disclosure will be described in detail with reference to the accompanying drawings. Herein, it is to be noted that in the drawings, the same reference numerals are given to the components having substantially the same or similar structures and functions, and repeated description thereof will be omitted.

In order to make the objectives, technical solutions and advantages of the embodiments of the present disclosure more clear, hereinafter the technical solutions in the embodiments of the present disclosure will be described clearly and comprehensively in combination with the drawings. Obviously, these described embodiments are parts of the embodiments of the present disclosure, rather than all of the embodiments thereof. All the other embodiments obtained by those of ordinary skill in the art based on the embodiments of the present disclosure without paying creative efforts fall into the protection scope of the present disclosure.

Unless otherwise defined, technical terms or scientific terms used herein shall have common meaning known by those skilled in the art of the present disclosure. Words and expressions such as "first", "second" and the like used in the present disclosure do not denote any sequence, quantity or priority, but distinguish different components. Likewise, words such as "include", "comprise" and the like refer to that an element or an object before this word contains all the elements or objects listed thereinafter or alternatives thereof, without excluding other elements or objects. Words such as "connected", "connecting" and the like are not restricted to physical or mechanical connections, but may include electrical connections, regardless of direct or indirect connections. Words such as "up", "below", "left", "right", etc., are only used to denote relative positional relationship, once an absolute position of the described object changes, the relative positional relationship may probably change correspondingly.

In a first aspect of the embodiments of the present disclosure, an embodiment of a communication method is provided, with which communication can be implemented in a relatively convenient and economical way. FIG. 1A shows a schematic flow diagram of a communication method according to an embodiment of the present disclosure.

Referring to FIG. 1A, firstly, in step S101, constructing a target group, wherein the target group includes the communication device and at least one other communication device, and each communication device in the target group sequentially transmits a message on a communication frequency point of the target group.

The communication device, that is, a terminal device, which is a device that participates in information transmission and reception in the target group.

The communication frequency point is a frequency point on which the target group performs data communication in a communication frequency band.

Wherein constructing a target group may be, for example, directly establishing a target group, or may also be joining an existing target group. The embodiment of the present disclosure is not limited by the specific manner in which the target group is constructed.

After the construction of the target group, in step S102, determining a priority of the communication device in the target group, and determining a transmission time slot corresponding to the priority according to the priority.

The priority in the present disclosure characterizes the transmission order when a plurality of communication devices in the target group data sequentially transmit data message sequentially on a communication frequency point. For example, when there is a first communication device and a second communication device in the group, and the first communication device has a higher first priority and the second communication device has a lower second priority, then on the communication frequency point of the target group, firstly, the first communication device will transmit data message, and secondly, the second communication device will transmit data message.

The priority of each communication device in the target group may be, for example, a transmission order preset in the target group, or may be randomly determined based on an attribute value of each communication device in the target group, or also may be determined based on the sequence in which each communication device joins the target group. The embodiment of the present disclosure is not limited by the manner in which the priority of the communication device in the target group is determined.

The transmission time slot indicates one or more time segments (each time segment is defined by a starting point and an ending point) in which each communication device in the target group performs data transmission when multiple communication devices in the target group sequentially perform data transmission. For respective communication devices with different priorities in the target group, their corresponding transmission time slots are different.

After determining the transmission time slot, in step S103, transmitting a data message in the transmission time slot, and receiving a data message at a time other than the transmission time slot.

Based on the above, the embodiment of the present disclosure can simplify the communication process by means of establishing a target group having at least two communication devices, and determining a priority and a transmission time slot thereof for each communication device in the constructed communication group, and further setting that the communication device transmits data message in its transmission time slot and receives data in the remaining time. Moreover, the communication method can support full-duplex communication among multiple people by means of time division multiplexing, which can avoid or greatly reduce the air collision phenomenon of multiple channels of wireless signals. Compared with the half-duplex communication (such as interphone) or full-duplex voice communication (such as telephone, mobile phone) which merely supports a group of two persons, the communication method of the present disclosure has a wider range of applications.

Figure 1B:
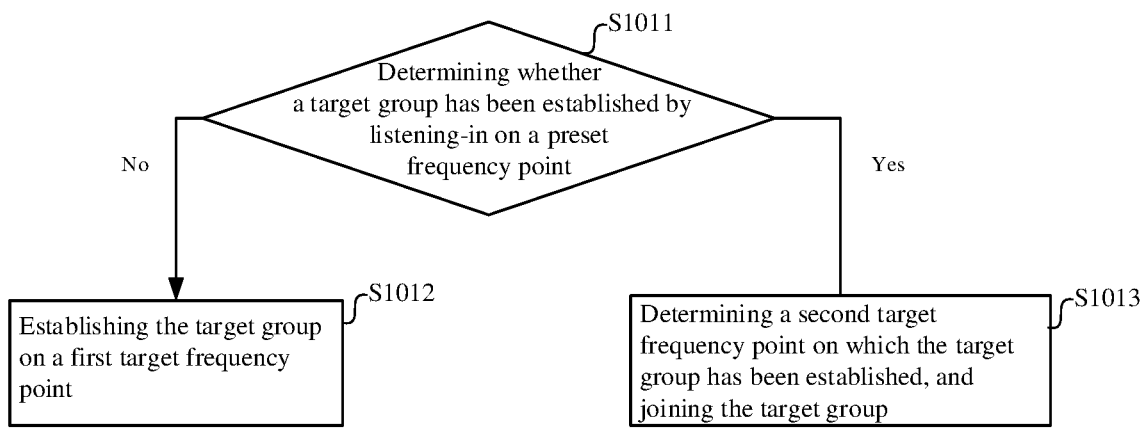
FIG. 1B illustrates a flow diagram of constructing a target group in a communication method according to an embodiment of the present disclosure.

FIG. 1B illustrates a flow diagram of constructing a target group in a communication method according to an embodiment of the present disclosure.

Referring to FIG. 1B, the above-described process of constructing a target group can be described in more detail. In some embodiments, the process of constructing a target group includes: in step S1011, during a preset listening-in time period, determining whether a target group has been established by listening-in on a preset frequency point.

The preset frequency point may be, for example, all frequency points available for communication of the communication device itself, or may be multiple frequency points predetermined among all frequency points, for example, 16 frequency points may be preset among all frequency points, in order to reduce the time taken for the system to scan all frequency points and to make adjacent frequency points keep at a certain security interval to avoid adjacent channel interference, however, other numbers of preset frequency points may also be set, the embodiment of the present disclosure is not limited by the number of frequency points.

The preset listening-in time may be, for example, 100 ms, or may be 300 ms. The embodiment of the present disclosure is not limited by the specific preset listening-in time.

Further, determining whether a target group has been established may be implemented, for example, by determining whether there is a signal related to the target group among the signals, for example, by identifying whether a preset group name is included in the signal, if no agreed group communication name in the signal being broadcasting, it indicates that the target group has not been established; or it may also be implemented by identifying whether the signal includes a preset feature code. The embodiment of the present disclosure is not limited by the specific manner for determining whether a target group has been established.

If the target group has not been established, then in step S1012, establishing the target group on a first target frequency point.

If the target group has been established, then in step S1013, determining a second target frequency point on which the target group has been established, and joining the target group.

For example, if it is monitored that group communication between designated communication devices has occurred on a certain frequency point, this frequency point (i.e., the second target frequency point) is recorded, and then a joining group message is sent so as to join the target group.

It should be noted that although the first target frequency point and the second target frequency point are distinguished in the foregoing steps, this is only for description convenience or conceptual distinction, and does not mean that the first target frequency point and the second target frequency point are actually two completely different frequency points. On the contrary, in practice, the two may be the same frequency point used in some cases, which is understandable based on the communication principle, and will not be detailed herein.

Through the above process, construction of the target group including the communication device can be realized in both the cases where the target group has not been established and the target group has been established.

In some embodiments, the first target frequency point and/or the second target frequency point are in the ISM 2.4 GHz frequency band, by means of setting the first target frequency point and/or the second target frequency point in the open frequency band without depending on the carrier network, communication fee or data traffic charge is not generated in the communication process of the target group, so that low-cost and efficient communication can be realized.

Figure 2:
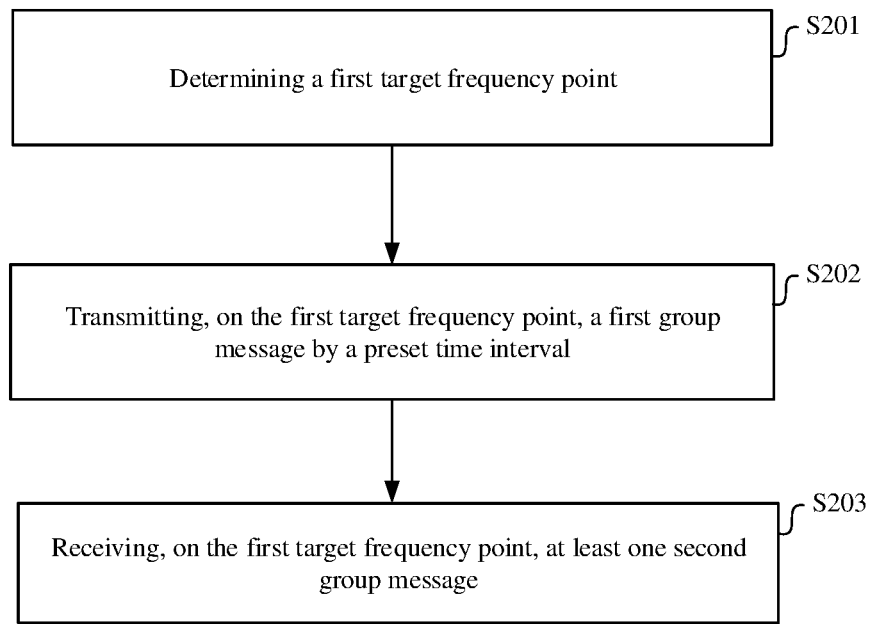
FIG. 2 illustrates a schematic flow diagram of establishing the target group in a communication method according to an embodiment of the present disclosure.

FIG. 2 illustrates a schematic flow diagram of establishing the target group in a communication method according to an embodiment of the present disclosure.

Referring to FIG. 2, in some embodiments, establishing the target group includes: first, in step S201, determining the first target frequency point. The first target frequency point is a frequency point which is not occupied among a plurality of preset frequency points; further, if there is a preset fixed frequency point for the target group among the unoccupied frequency points, the fixed frequency point may also be used as the first target frequency point.

In step S202, transmitting, on the first target frequency point, a first group message at a preset time interval, wherein the first group message includes a first group information and a first parameter, the first parameter is related to the priority (refer to the group name in Table 1 below).

In some embodiments, after determining the first target frequency point, the first group message begins to be broadcasted on the first target frequency point, the broadcast adopts a pulse mode, the broadcast is performed once at the interval of 50 ms (plus a small random delay), the broadcast time is 500 ms, the content of the first group message can refer to the join group broadcast frame shown in Table 1. A transmit priority field is used to indicate the priority of the communication device that sends the first group message in the target group, herein, the priority may be generated for example by using a random number (such as a random number generated by AD sampling), and the lower the random number is, the higher the priority is.

TABLE 1

| | Message content |
|---|---|
| Data frame type | Data frame format |
| Join group broadcast frame | Prefix code 55 01 Group name Device address Transmission priority Check |
| Voice data frame | Prefix code 55 02 Group name Device address Transmission priority Voice data information Number of successful reception Check |
| frequency hopping broadcast frame | Prefix code 55 03 Group name Device address Transmission priority Frequency hopping point Check |
| frequency hopping | Prefix code 55 04 Group name Device address Transmission |

TABLE 1-continued

Message content

| Data frame type | Data frame format |
|---|---|
| response broadcast frame | priority Frequency hopping result Check |
| group shut broadcast frame | Prefix code 55 05 Group name Device address Transmission priority Check |
| group shut response broadcast frame | Prefix code 55 06 Group name Device address Transmission priority quit result Check |

Further, in step S203, receiving, on the first target frequency point, at least one second group message, wherein the second group message includes a second group information and a second parameter, the second parameter is related to the priority; optionally, the second group information includes an identifier of the target group and a device address of a communication device belonging to the target group (refer to the join group broadcast frame in Table 1).

At other times during the communication cycle other than transmission of the first group message, other communication devices in the target group may receive the first group message (the broadcast is continuous and random, and air collision will not always occur) and thereby broadcasting the second group message.

It should be noted that the number of communication devices joining the target group may be more than one, therefore, contents of the second group messages received from different communication devices are not completely the same at this time.

Based on the above, by means of determining the first target frequency point and establishing the target group on the first target frequency point, construction of the target group is achieved in the case where no target group has been established.

Figure 3:
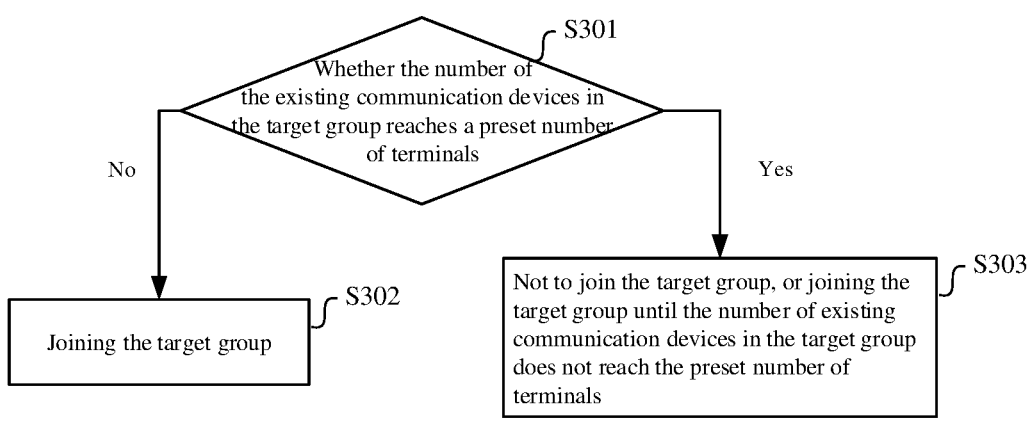
FIG. 3 illustrates a schematic flow diagram of joining the target group in a communication method according to an embodiment of the present disclosure.

FIG. 3 illustrates a schematic flow diagram of joining the target group in a communication method according to an embodiment of the present disclosure.

Referring to FIG. 3, in some embodiments, the process of joining the target group may further including: in step S301, determining whether a number of existing communication devices in the target group reaches a preset number of terminals.

The preset number of terminals may be, for example, 10 or may be 8. The embodiment of the present disclosure is not limited by the specific numerical value of the preset number of terminals.

For example, when the ISM 2.4 GHz frequency band is adopted, considering factors such as there must be a certain security time interval between respective actual transmission time slots, the actual data message also includes other information, the signal transmission may have delay, the buffer pressure of the audio data, and the like, the number of communication devices supported in the target group (i.e., the number of preset terminals) may be 8 or less.

Thereafter, in step S302, if the number of existing communication devices in the target group does not reach the preset number of terminals, joining the target group. For example, a group join message (refer to the aforementioned join group broadcast frame) is transmitted to join the target group.

Further, in step S303, if the number of existing communication devices in the target group has reached the preset number of terminals, it is not to join the target group, or joining the target group is performed until the number of existing communication devices in the target group does not reach the preset number of terminals.

Based on the above, by checking whether the number of communication devices in the target group reaches the preset number of terminals before joining the target group, it is possible to avoid the problem of communication quality degradation between communication devices caused by too many communication devices in the target group.

Figure 4:
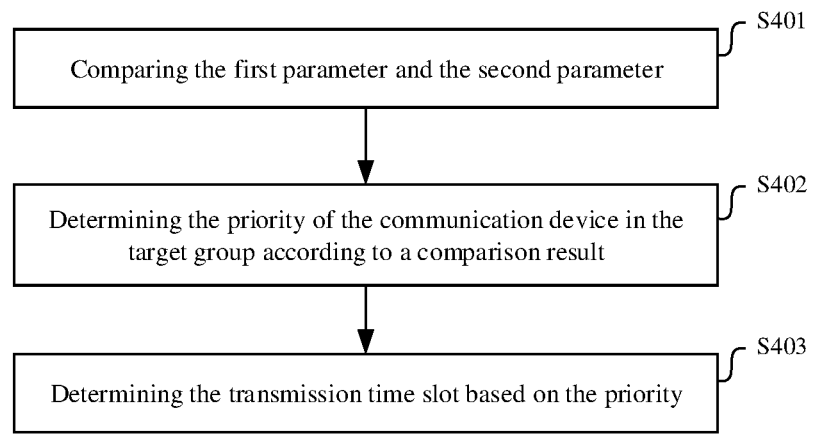
FIG. 4 illustrates a schematic flow diagram of determining a priority of the communication device in the target group and determining a transmission time slot according to the priority in a communication method according to an embodiment of the present disclosure.

FIG. 4 illustrates a schematic flow diagram of determining a priority in the target group, and determining a corresponding transmission time slot according to the priority in a communication method according to an embodiment of the present disclosure Referring to FIG. 4 and FIG. 2, in some embodiments, in a case where the target group is established at the first target frequency, a priority of the communication device in the target group is determined, and the process of determining the corresponding transmission time slot according to the priority can be more specifically explained.

First, in step S401, comparing the first parameter and the second parameter.

Specifically, description is provided with the assumption that second group messages from three other communication devices (A, B, C) are received as an example. The second parameter in the second group message from the communication device A is for example 3, the second parameter in the second group message from the communication device B is for example 15, the second parameter in the second group message from the communication device C is for example 7, and the first parameter is for example 1. In this example, the first parameter and the three second parameters are sequentially arranged in order from small to large as: the first parameter 1, the second parameter 3 corresponding to the communication device A, the second parameter 7 corresponding to the communication device C, and the second parameter 15 corresponding to the communication device B.

Based on the comparison of the first parameter and the second parameter, in step S402, determining the priority of the communication device in the target group according to a comparison result.

Specifically, based on the result of the comparison, the communication device determines its transmission priority in the target group. For example, based on the rule that the smaller the parameter is, the higher the priority is, the transmission priority of the communication device is determined to be 1, the transmission priority of the communication device A is 2, the transmission priority of the communication device C is 3, and the transmission priority of the communication device B is 4. Optionally, the transmission priority of the first communications device may be determined based on the rule that the larger the parameter is, the higher the transmission priority is, and the details are not described herein.

After determining the priority, in step 403, determining the transmission time slot based on the priority.

Specifically, based on the transmission priority, the native communication device determines its own transmission time slot. In this example, since the transmission priority of the native communication device is 1, the transmission time slot for the native communication device is a time slot numbered 1 among all time slots for the entire target group. Optionally, it is also possible to determine the transmission time slot based on the transmission priority by adopting other mapping relationship of one-to-one correspondence between the transmission priority and each transmission time slot. The embodiment of the present disclosure is not limited by the specific manner in which the time slot is determined.

In some embodiments, in the case of joining the already-established target group on the second target frequency point, the process of determining the priority in the target group and determining the transmission time slot corresponding to the priority may be more specifically described.

First, the priority of the communication device is set to be lower than the priority of other communication devices in the target group.

For example, in the case where the number of preset terminals in the target group is 6, the corresponding priority has 6 levels, and in the case where there are three communication devices whose priorities are 1, 2, and 3 respectively in the current target group, after the communication device joins the group, its priority may be set to any of 4, 5, and 6. The embodiment of the present disclosure is not limited by the specific numerical value of the priority set for the communication device.

Thereafter, on the basis of determining the priority, the transmission time slot is further determined based on the priority.

For example, in the case of determining that the transmission priority of the native communication device is 4, the transmission time slot for the native communication device is for example a time slot numbered 4 in all time slots of the entire target group.

Optionally, it is also possible to determine the transmission time slot based on the determined transmission priority by adopting other mapping relationship of one-to-one correspondence between the transmission priority and each transmission time slot. The embodiment of the present disclosure is not limited by the specific manner in which the time slot is determined.

Based on the foregoing steps, on the basis of constructing the target group, each communication device in the target group can determine its own transmission time slot in the target group accordingly, so as to perform effective communication based on the transmission time slot.

Figure 5:
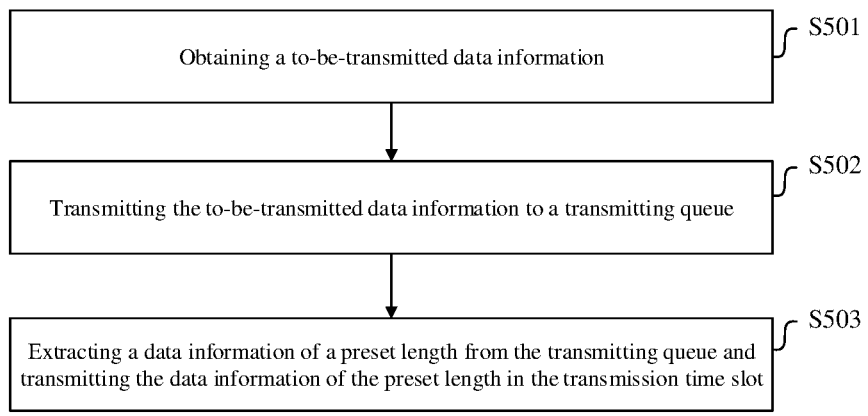
FIG. 5 illustrates a schematic flow diagram of transmitting a data message in the transmission time slot according to an embodiment of the present disclosure.

FIG. 5 illustrates a schematic flow diagram of transmitting the data message in the transmission time slot according to an embodiment of the present disclosure. Referring to FIG. 5, the process of transmitting the data message can be described in more detail.

First, in step S501, obtaining a to-be-transmitted data information.

Optionally, the data information may be text information, voice information, or the like. The text information may be inputted through a button provided on the communication device, or may be inputted through an electronic keyboard having a touch function. The voice information may be acquired by a microphone provided on the communication device.

In some embodiments, the communication device will always filter the analog audio (to-be-transmitted data message) acquired by the microphone and digitize it using an audio codec internal to the control unit of the communication device for further processing.

Thereafter, in step S502, transmitting the to-be-transmitted data information to a transmitting queue. Optionally, the transmitting queue adopts for example a message queue data structure, similar to an FIFO (First Input First Output) queue.

After transmitting the to-be-transmitted data message to the transmitting queue, in step S503, extracting a data information of a preset length from the transmitting queue and transmitting the data information of the preset length in the transmission time slot.

In some embodiments, once the transmission time slot for the communication device arrives, the control unit of the communication device begins to retrieve a data information of a preset length (e.g., 24 bits (3 bytes)) from the transmitting queue and compresses the 24-bit linear code into an 8-bit compressed code according to the G.711 A rate compression standard (here, optionally, the program block has been made into an A-rate compression table to maximize data processing performance) to reduce the wireless data bandwidth, all compressed audio data will be stored in another transmitting queue for buffering and then sent out through the signal transceiving unit of the communication device.

Based on the above, the communication device can acquire the to-be-transmitted data information, and transmit the data information through the signal transceiving unit in the transmission time slot corresponding to the communication device, so as to implement a good information interaction process.

Figure 6:
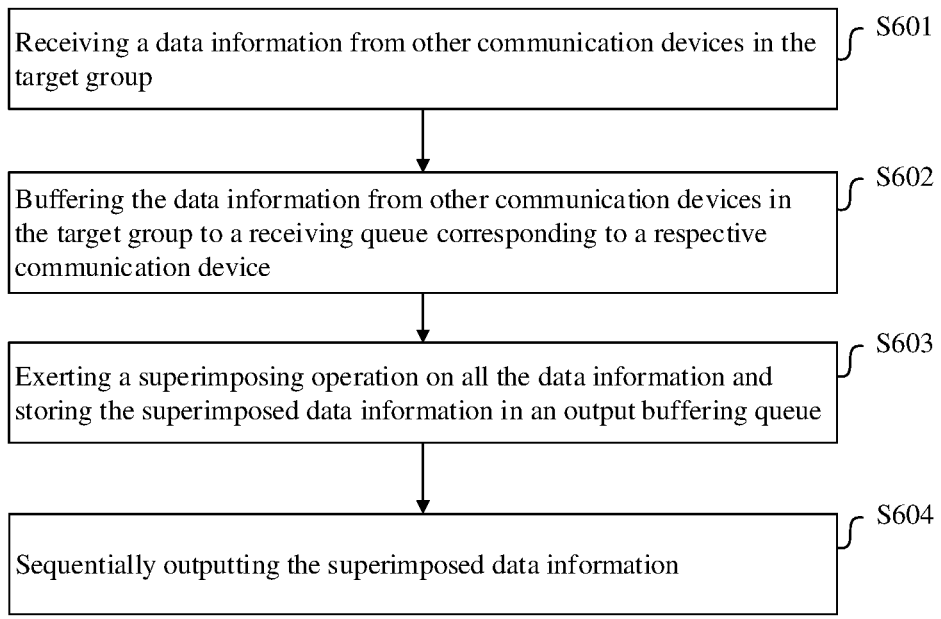
FIG. 6 illustrates a schematic flow diagram of receiving a data message in a communication method according to an embodiment of the present disclosure.

FIG. 6 illustrates a schematic flow diagram of receiving a data information in a communication method according to an embodiment of the present disclosure.

Referring to FIG. 6, the process of receiving data message at a time other than the transmission time slot may be described in more detail.

First, in step S601, receiving a data information from other communication devices in the target group.

After receiving the data information from the other communication devices, in step S602, buffering the data information from other communication devices in the target group to a receiving queue corresponding to a respective communication device. Optionally, each communication device corresponds to one receiving queue.

After being buffered to the corresponding receiving queue, in step S603, exerting a superimposing operation on all the data information and storing the superimposed data information in an output buffering queue.

Finally, in step S604, sequentially outputting the superimposed data information; optionally, if the data message is text information, it may be displayed through a display screen of the communication device, and if the data information is voice information, the communication device may be outputted through a speaker of the communication device or a connected headphone.

In some embodiments, a wireless signal transmitting or receiving state of the communication device is effectuated by the control unit controlling a high frequency switch, and the switch is switched to the PA (Power Amplifier) to be coupled to the antenna only when the audio signal needs to be transmitted; otherwise, it is in the receiving state, that is, the high frequency switch is switched to the LNA (Low Noise Amplifier) to be coupled to the antenna.

Based on the above process, all communication devices in the target group can communicate with each other, that is, all communication devices can simultaneously transmit wireless voice signals and transmit in the air without collision (or the collision probability is extremely low), and all other terminals can make a reception In some embodiments, the communication method further includes: determining, according to the priority, one communication device in the target group as a master device, and determining other communication devices in the target group other than the master device as slave devices.

Specifically, it may be pre-defined in the target group network that there is only one master device, and other communication devices are slave devices. The master device is used for monitoring and statistics of the communication quality on the frequency point and managing the switching of other slave devices, that is, realizing group frequency hopping communication management. Optionally, the communication device with the highest priority in the target group may be the master device, and the other terminals are the slave devices, and each of the slave devices is based on the transmission time slot of the master device, and the time slot estimation is carried out according to the transmission priority of the master device, re-transmission timing in a system dynamic running state is realized.

Based on the above, by setting the master device and the slave device in the target group, it is possible to better manage the communication of the target group, which is advantageous for implementing a more efficient communication process.

Further, an expression for determining a corresponding transmission time slot according to the priority is:

$$t_r - \frac{b_A * T_s}{b_P} + \frac{n * T_s}{m},$$

where $t_r$ is a moment at which the data message of the master device is received, if the data message is voice information, $t_r$ is a moment at which an audio data packet of the master device is received; $T_s$ is a communication cycle, if the data message is voice information, $T_s$ is an audio sampling period (such as 8 ms); $b_A$ is a data encoding rate, if the data message is voice information, $b_A$ is an audio encoding rate, it is, for example, 64 kbps when the G.711 standard is adopted; $b_P$ is an air interface data transmission rate, if the signal transceiving unit is a 2.4 GHz wireless transceiver chip, $b_P$ is an over-the-air transmission physical layer data rate of the 2.4 GHz wireless transceiver chip, and is set to 1 Mbps (the 2.4G wireless transceiver usually supports up to 2 Mbps) herein; n is the priority of the communication device, and m is the preset number of terminals in the target group.

Based on the above, each slave device in the target group calculates the corresponding transmission time slot according to its own transmission priority and based on the transmission time slot of the master device, thereby realizing re-transmission timing in a system dynamic running state, which is beneficial to flexible adjustment of the transmission time slot.

Optionally, when the ISM 2.4 GHz frequency band is adopted, considering factors such as there must be a certain security time interval between respective actual transmission time slots, the actual data message also includes other information, the signal transmission may have delay, the buffer pressure of the audio data, and the like, the number of preset terminals may be set as 8.

The downside of fixed-frequency-point communication is that it is susceptible to interference, this problem will be more prominent especially in the 2.4G band, because there are many communication terminals at 2.4G, including Wi-Fi, Bluetooth, etc., the group communication system must support the frequency hopping function so as to enhance anti-interference.

Figure 7:
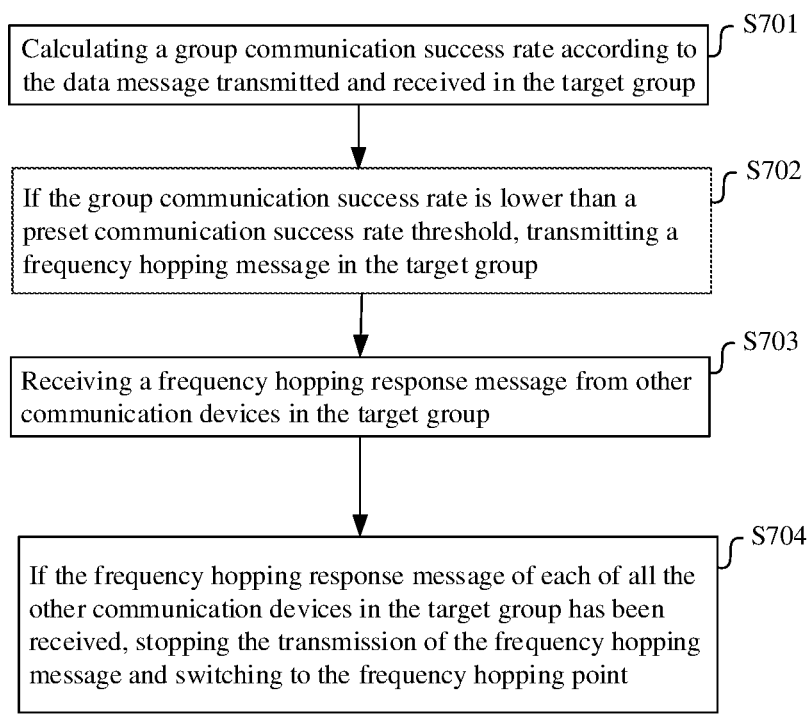
FIG. 7 illustrates a schematic flow diagram of a communication method in a case where the communication device is a master device according to an embodiment of the present disclosure.

FIG. 7 illustrates a schematic flow diagram of a communication method in a case where the communication device is a master device according to an embodiment of the present disclosure.

Referring to FIG. 7, in some embodiments, if the communication device is the master device, the communication method further includes: first, in step S701, calculating a group communication success rate according to a data message transmitted and received in the target group, the data message including a third parameter indicative of a quantity of successful data reception.

Specifically, each communication device in the target group performs statistics on the data message receiving status of other communication devices, and reflects in a successful reception number field in the frame transmitted by it. The master device receives the successful reception number field of all the slave devices in the target group, and performs statistics and judgment on the group communication success rate of the current channel, where the calculation formula is $$\frac{\sum_{i=1}^{N}\left(\sum_{j=1}^{200} S_{ij}\right)}{N*(N-1)*200},$$

where N is the number of communication devices currently joining the group; 200 is an example number of times of communication; $S_{ij}$ is the number of successful receptions that an i-th communication device successfully receives information of other communication devices during a j-th communication.

After the group communication success rate is calculated, in step S702, if the group communication success rate is lower than a preset communication success rate threshold, a frequency hopping message is transmitted in the target group, wherein the frequency hopping message includes a frequency hopping point. The master device may, for example, transmit a frequency hopping message (such as the frequency hopping broadcast frame in Table 1) in its own transmission time slot.

For example, if the group communication success rate is lower than a set threshold (such as 80%), it may indicate that the current channel communication quality is poor (there may be co-channel interference), and the master device switches the system communication frequency point to a next frequency point.

The frequency hopping point may be, for example, a random frequency point other than the upper and lower frequency points of the current channel as determined by using the random number. Alternatively, it may be based on other rules, the embodiment of the present disclosure is not limited by the specific manner of determining the frequency hopping point and the determined specific frequency hopping point.

After transmitting the frequency hopping message, in step S703, receiving a frequency hopping response message from other communication devices in the target group.

Specifically, after receiving the frequency hopping message, the other slave devices in the target group transmit a frequency hopping response message in their own transmission time slot (such as the response frequency hopping broadcast frame shown in Table 1), and the master device receives the frequency hopping response message.

Finally, in step S704, if the frequency hopping response message of each of all the other communication devices in the target group are received, stopping the transmission of the frequency hopping message and switching to the frequency hopping point.

Specifically, the master device will transmit the frequency hopping message all along until all slave devices successfully switch, and the master device is the last one that switches to the frequency hopping point.

Figure 8:
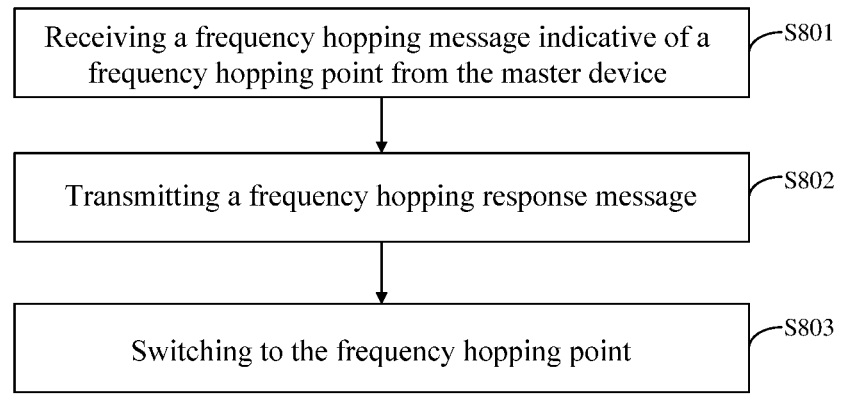
FIG. 8 illustrates a schematic flow diagram of a communication method in a case where the communication device is a slave device according to an embodiment of the present disclosure.

FIG. 8 illustrates a schematic flow diagram of a communication method in a case where the communication device is a slave device according to an embodiment of the present disclosure.

Referring to FIG. 8, in some embodiments, if the communication device is the slave device, the communication method further includes: first, in step S801, receiving a frequency hopping message indicative of a frequency hopping point from the master device; thereafter, in step S802, transmitting a frequency hopping response message; finally, in step S803, switching to the frequency hopping point. At this point, all communication devices in the target group have switched to the new frequency point to continue communication and channel quality monitoring.

When the user of the master device thinks that the communication can be ended, the master device initiates the step of ending group communication with transmitting a group communication end broadcast (as the group shut broadcast frame in Table 1), each of the slave devices will feed back group shut response broadcast frame after receiving the group shut broadcast frame and automatically enter a deep sleep state. When the user of the slave device thinks that the communication can be exited, the slave device transmits a group exit broadcast frame, then the slave device enters a deep sleep state, the communication of other slave devices and the master device will continue.

It can be seen from the above embodiment, different than that the two parties need to manually switch the communication channel to continue the call when interference or conflict occurs to the interphone during a call, the master device in the communication method supports channel monitoring and carrier collision detection, and manages the other communication devices (slave devices) in the target group to switch to the designated frequency point to continue communication when co-channel interference occurs, thereby improving the anti-interference ability of the group communication system, it is more "smart" than the interphone, and is more convenient for users, especially the elderly and children.

Figure 9:
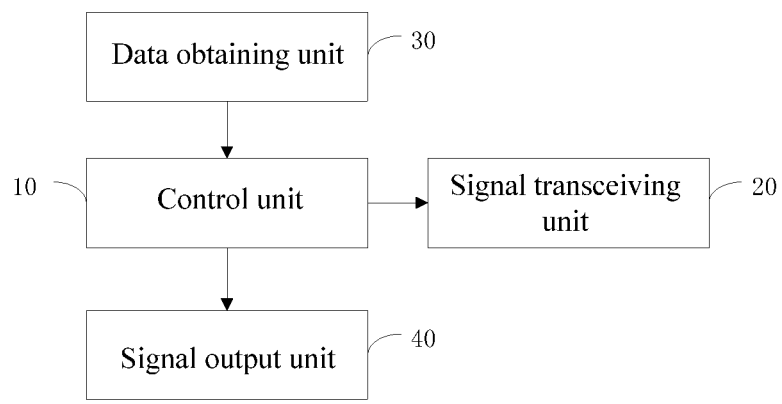
FIG. 9 is a schematic structural diagram of an embodiment of a communication apparatus according to the present disclosure.

In a second aspect of the embodiments of the present disclosure, an embodiment of a communication apparatus is provided, with which communication can be implemented in a relatively convenient and economical way. FIG. 9 is a schematic structural diagram of an embodiment of a communication apparatus according to the present disclosure.

The communication apparatus comprises a control unit 10 and a signal transceiving unit 20. The control unit 10 is configured to: construct a target group, wherein the target group includes the communication device and at least one other communication device, and each communication device in the target group sequentially transmits a message on a communication frequency point of the target group; determine a priority of the communication device in the target group, and determine a transmission time slot corresponding to the priority according to the priority; transmit, by the signal transceiving unit, a data message in the transmission time slot, and receive, by the signal transceiving unit, a data message at a time other than the transmission time slot.

The priority in the present disclosure characterizes the transmission order when data is sequentially transmitted by a plurality of communication devices in a target group on a communication frequency point. For example, when there is a first communication device and a second communication device in the group, and the first communication device has a higher first priority and the second communication device has a lower second priority, then, on the communication frequency point of the target group, the first communication device will transmit data first, and the second communication device will transmit data next.

The priority of each communication device in the target group may be, for example, a transmission order preset in the target group, or may be randomly determined based on an attribute value of each communication device in the target group, or also may be determined based on the sequence in which each communication device joins the target group. The embodiment of the present disclosure is not limited by the manner in which the priority of the communication device in the target group is determined.

The transmission time slot characterizes one or more time segments (each time segment is defined by a starting point and an ending point) in which each communication device performs data transmission when multiple communication devices in the target group sequentially perform data transmission. For respective communication devices with different priorities in the target group, their corresponding transmission time slots are different.

Based on the above, the embodiment of the present disclosure can simplify the communication process by means of establishing a target group having at least two communication devices, and determining a priority and a transmission time slot thereof for each communication device in the constructed communication group, and further setting that the communication device transmits data in its transmission time slot and receives data in the remaining time. Moreover, it can support full-duplex communication among multiple people by means of time division multiplexing, which can avoid or greatly reduce the air collision phenomenon of multiple channels of wireless signals. Compared with the half-duplex (such as interphone) supporting only a group of two persons, it has a wider range of applications.

In some embodiments, the control unit is configured to: determine whether a target group has been established by listening-in, during a preset listening-in time period, on a preset frequency point with the use of the signal transceiving unit; if the target group has not been established, establish the target group on a first target frequency point; if the target group has been established, determine a second target frequency point on which the target group has been established, and join the target group.

The preset frequency point may be, for example, all frequency points available for communication of the communication device itself, or may be multiple frequency points predetermined among all frequency points, for example, 16 frequency points may be preset among all frequency points, in order to reduce the time taken for the system to scan all frequency points, and to make adjacent frequency points keep at a certain security interval to avoid adjacent channel interference, or other numbers of preset frequency points may also be set, the embodiment of the present disclosure is not limited by the number of frequency points.

Specifically, a 2.4G radio frequency transceiver (which may also be a 2.4 GHz radio transceiver chip) usually has up to 125 frequency points available. To reduce the time it takes for the system to scan all frequency points, it is possible to limit the use of only 16 frequency points, and adjacent frequency points maintain a certain security interval to avoid adjacent channel interference.

The preset listening-in time may be, for example, 100 ms, or may be 300 ms. The embodiment of the present disclosure is not limited by the specific preset listening-in time.

The determining process may be carried out by identifying whether a preset group name is included in the signal, for example, if no agreed group communication name was found in the signal being broadcasting, it indicates that the target group has not been established; or it may also be implemented by identifying whether the signal includes a preset feature code. The embodiment of the present disclosure is not limited by the specific manner for determining whether the signal is related to the target group.

By means of setting the control unit to execute the above steps, construction of the target group including the communication device can be realized in both the cases where the target group has not been established and the target group has been established.

In some embodiments, the first target frequency point and/or the second target frequency point are in the ISM 2.4 GHz frequency band, by means of setting the first target frequency point and/or the second target frequency point in the open frequency band without depending on the carrier network, communication fee or traffic charge is not generated in the communication process of the target group, so that low-cost and efficient communication can be realized.

In some embodiments, the control unit 10 is configured to: determine a first target frequency point; transmit, by the signal transceiving unit, on the first target frequency point, a first group message at a preset time interval, receive, by the signal transceiving unit, on the first target frequency point, at least one second group message Herein, the first group message includes first group information and a first parameter, the first parameter is related to the priority; the second group message includes second group information and a second parameter, the second parameter is related to the priority.

The process of determining the first target frequency point may be determining one frequency point that is not occupied among the plurality of preset frequency points as a target frequency point; further, if there is a preset fixed frequency point among the unoccupied frequency points, the fixed frequency point may also be used as the first target frequency point.

It should be noted that the number of communication devices joining the target group may be more than one, therefore, contents of the second group messages received from different communication devices are not completely the same at this time.

Based on the above, by means of determining the first target frequency point and establishing the target group on the first target frequency point, construction of the target group is achieved in the case where no target group has been established.

In some embodiments, the control unit 10 is configured to: determine whether the number of existing communication devices in the target group reaches a preset number of terminals; if the number of existing communication devices in the target group does not reach the preset number of terminals, join the target group.

Based on the above, by checking whether the number of communication devices in the target group reaches the preset number of terminals before joining the target group, it is possible to avoid the problem of communication quality degradation between communication devices caused by too many communication devices in the target group.

In some embodiments, the control unit 10 is configured to: compare the first parameter and the second parameter; determine the priority of the communication device in the target group according to a comparison result; determine the transmission time slot based on the priority.

The process of comparing the first parameter and the second parameter to determine a priority in the target group. Specifically, the native communication device determines its transmission priority in the target group based on the result of the comparison. In particular, description is provided with the assumption that the second group messages from three other communication devices (A, B, C) are received as an example. The second parameter in the second group message from the communication device A is for example 3, the second parameter in the second group message from the communication device B is for example 15, the second parameter in the second group message from the communication device C is for example 7, and the first parameter is for example 1. In this example, the first parameter and the three second parameters are sequentially arranged in order from small to large as: the first parameter 1, the second parameter 3 corresponding to the communication device A, the second parameter 7 corresponding to the communication device C, and the second parameter 15 corresponding to the communication device B.

For example, based on the rule that the smaller the parameter is, the higher the priority is, the transmission priority of the communication device is determined to be 1, the transmission priority of the communication device A is 2, the transmission priority of the communication device C is 3, and the communication device B The sending priority is 4. Optionally, the transmission priority of the first communications device may be determined based on the rule that the larger the parameter is, the higher the transmission priority is, and the details are not described herein.

The process of determining the transmission time slot based on the priority, specifically, is the communication device determines its own transmission time slot based on the transmission priority. In the above example, since the transmission priority of the native communication device is 1, the transmission slot used for the native communication device is a slot numbered 1 in all slots for the entire target group.

Optionally, it is also possible to determine the transmission time slot based on the transmission priority by adopting other mapping relationship of one-to-one correspondence between the transmission priority and each transmission time slot.

In some embodiments, the control unit 10 is configured to: set the priority of the communication device to be lower than the priority of other communication devices in the target group; determine the transmission time slot based on the priority.

For example, in the case where the number of preset terminals in the target group is 6, the corresponding priority has 6 levels, and in the case where there are three communication devices whose priorities are 1, 2, and 3 respectively in the current target group, after the communication device joins the group, its priority may be set to any of 4, 5, and 6. The embodiment of the present disclosure is not limited by the specific numerical value of the priority set for the communication device.

Further, for example, in the case of determining that the transmission priority of the native communication device is 4, the transmission time slot for the native communication device is for example a time slot numbered 4 in all time slots of the entire target group.

Optionally, it is also possible to determine the transmission time slot based on the transmission priority by adopting other mapping relationship of one-to-one correspondence between the transmission priority and each transmission time slot.

Based on the above, on the basis of constructing the target group, each communication device in the target group can determine its own transmission time slot in the target group accordingly, so as to perform effective communication based on the transmission time slot.

In some embodiments, the communication apparatus further comprises a data obtaining unit 30; the data obtaining unit 30 is configured to obtain a to-be-transmitted data information; the control unit 10 is configured to transmit the to-be-transmitted data information to a transmitting queue, and extract a data information of a preset length from the transmitting queue and transmit, by the signal transceiving unit 20, the data information of the preset length in the transmission time slot.

Based on the above, the communication device is capable of obtaining the to-be-transmitted data information through the data obtaining unit, and transmitting data information through the signal transceiving unit in the transmission time slot corresponding to the communication device.

The data information may be, for example, text information, voice information, or the like. The text information may be inputted through a button provided on the communication device, or may be inputted through an electronic keyboard having a touch function. The voice information may be acquired by a microphone provided on the communication device.

For example, the communication device will always filter the analog audio (to-be-transmitted data message) acquired by the microphone and digitize it using an audio codec internal to the control unit of the communication device for further processing.

In some embodiments, the transmitting queue adopts for example a message queue data structure, similar to an FIFO (First Input First Output) queue.

In some embodiments, the communication apparatus further comprises a data output unit 40. The signal transceiving unit 20 is configured to receive a data information from other communication devices in the target group; the control unit 10 is configured to buffer the data information from other communication devices in the target group to a receiving queue corresponding to a respective communication device, exert a superimposing operation on all the data information and store the superimposed data information in an output buffering queue, and sequentially output, by the signal output unit 40, the superimposed data information.

Optionally, if the data information is text information, it may be displayed through a display screen of the communication device, and if the data information is voice information, the communication device may be outputted through a speaker of the communication device or a connected headphone.

By now, all communication devices in the target group can communicate with each other, that is, all communication devices can simultaneously transmit wireless voice signals and transmit in the air without collision (or the collision probability is extremely low), and all other terminals can make a reception In some embodiments, the control unit is configured to: determine, according to the priority, one communication device in the target group as a master device, and determine other communication devices in the target group other than the master device as slave devices.

Specifically, the master device is used for monitoring and statistics of the communication quality on the frequency point and managing the switching of other slave devices, that is, realizing group frequency hopping communication management. For example, the communication device with the highest priority in the target group may be determined as the master device, or the communication device with the lowest priority may be determined as the master device. The embodiment of the present disclosure is not limited by the specific manner for determining the master device based on the priority.

Based on the above, by setting the master device and the slave device in the target group, it is possible to better manage the communication of the target group, which is advantageous for implementing a more efficient communication process.

In some implementations, an expression for determining a corresponding transmission time slot according to the priority is:

$$t_r - \frac{b_A * T_s}{b_P} + \frac{n * T_s}{m},$$

where $t_r$ is a moment at which the data message of the master device is received, if the data message is voice information, $t_r$ is a moment at which an audio data packet of the master device is received; $T_s$ is a communication cycle, if the data message is voice information, $T_s$ is an audio sampling period (such as 8 ms); $b_A$ is a data encoding rate, if the data message is voice information, $b_A$ is an audio encoding rate, it is, for example, 64 kbps when the G.711 standard id adopted; $b_P$ is an air interface data transmission rate, if the signal transceiving unit is a 2.4 GHz wireless transceiver chip, $b_P$ is an over-the-air transmission physical layer data rate of the 2.4 GHz wireless transceiver chip, and is set to 1 Mbps (the 2.4G wireless transceiver usually supports up to 2 Mbps) herein; n is the priority of the communication device, and m is the preset number of terminals in the target group.

Based on the above, each slave device in the target group calculates the corresponding transmission time slot according to its own transmission priority and based on the transmission time slot of the master device, thereby realizing re-transmission timing in a system dynamic running state, which is beneficial to flexible adjustment of the transmission time slot.

The downside of fixed-frequency-point communication is that it is susceptible to interference, this problem will be more prominent especially in the 2.4G band, because there are many communication terminals at 2.4G, including Wi-Fi, Bluetooth, etc., the group communication system must support the frequency hopping function so as to enhance anti-interference.

Accordingly, in some embodiments, if the communication device is a master device, the control unit 10 is configured to: calculate a group communication success rate according to a data message transmitted and received in the target group, the data message including a third parameter indicative of a quantity of successful data reception; if the group communication success rate is lower than a preset communication success rate threshold, transmit, by the signal transceiving unit, a frequency hopping message in the target group, the frequency hopping message including a frequency hopping point; receive, by the signal transceiving unit, a frequency hopping response message from other communication devices in the target group; if the frequency hopping response message of each of all the other communication devices in the target group are received, stop the transmission of the frequency hopping message and switch to the frequency hopping point.

The calculating a group communication success rate may, for example, be: each communication device in the target group performs statistics on the data message receiving status of other communication devices, and reflects in a successful reception number field in the frame transmitted by it. The master device receives the successful reception number field of all the slave devices in the target group, and performs statistics and judgment on the group communication success rate of the current channel, where the calculation formula is $$\frac{\sum_{i=1}^{N}\left(\sum_{j=1}^{200} S_{ij}\right)}{N*(N-1)*200},$$

where N is the number of communication devices currently joining the group; 200 is an example number of times of communication; $S_{ij}$ is the number of successful receptions that an i-th communication device successfully receives information of other communication devices during a j-th communication. And if the group communication success rate is lower than a set threshold (such as 80%), it may indicate that the current channel communication quality is poor (there may be co-channel interference), and the master device switches the system communication frequency point to a next frequency point.

The frequency hopping point may be, for example, a random frequency point other than the upper and lower frequency points of the current channel as determined by using the random number. Alternatively, it may be based on other rules, the embodiment of the present disclosure is not limited by the specific manner of determining the frequency hopping point and the determined specific frequency hopping point.

When detecting that the current communication quality is not good, based on the above process, the communication device in the target group can switch to the new frequency point to continue communication and channel quality monitoring. Different than that two parties need to manually switch the communication channel to continue the call when interference or conflict occurs to the interphone during a call, the master device in the communication method supports channel monitoring and carrier collision detection, and manages the other communication devices (slave devices) in the target group to switch to the designated frequency point to continue communication when co-channel interference occurs, thereby improving the anti-interference ability of the group communication system, it is more "smart" than the interphone, and is more convenient for users, especially the elderly and children.

When the user of the master device thinks that the communication can be ended, the master device initiates the step of ending group communication with transmitting a group communication end broadcast (as the group shut broadcast frame shown in Table 1), each of the slave devices will feed back a group shut response broadcast frame after receiving the broadcast and automatically enter a deep sleep state. When the user of the slave device thinks that the communication can be exited, the slave device transmits a group exit broadcast frame, then the slave device enters a deep sleep state, and the communication of other slave devices and the master device will continue.

Figure 10:
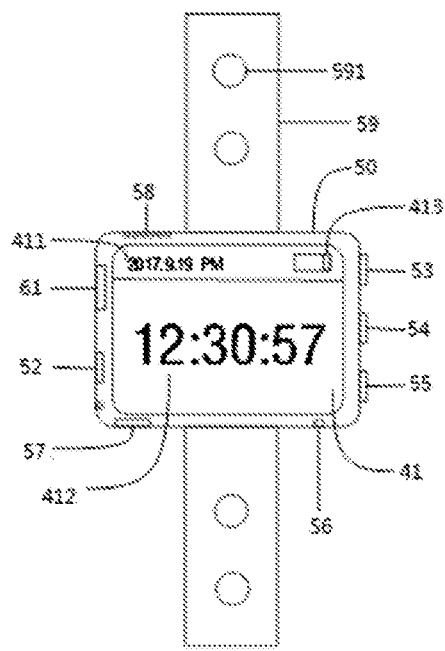
FIG. 10 is a schematic diagram of an outer structure of an embodiment of a communication apparatus according to the present disclosure.

According to the embodiments of the present disclosure, the communication apparatus may be a wearable device, which can enable convenient and economical communication. FIG. 10 is a schematic diagram of an outer structure of an embodiment of a wearable device according to the present disclosure.

Figure 11:
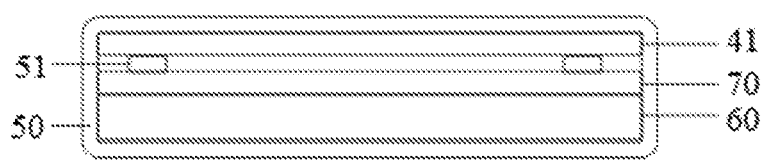
FIG. 11 is a cross-sectional view of an embodiment of the communication apparatus shown in FIG. 10.

The wearable device comprises any embodiment of the foregoing communication apparatus, the wearable device further comprises a housing 50, a data output unit 40, a battery unit 60, and a circuit board 70, the data output unit 40 includes a display unit 41, the control unit 10 and the signal transceiving unit 20 are disposed on the circuit board 70; the display unit 41, the circuit board 70, and the battery unit 60 are sequentially stacked in the housing 50, as shown in FIG. 11.

Optionally, as shown in FIG. 11, the wearable device further comprises a support post 51 disposed between the circuit board 70 and the display unit 41 for separating the two; optionally, the display unit 41 is a OLED display screen used to provide a better display effect; optionally, the wearable device may be a wearable device such as a smart watch or smart glasses, so as to have an intelligent operation function on the one hand and also have regular features on the other hand, making it easy for users to use. Optionally, the data output unit 40 may further include a microphone 71 for outputting the received voice information.

Figure 13:
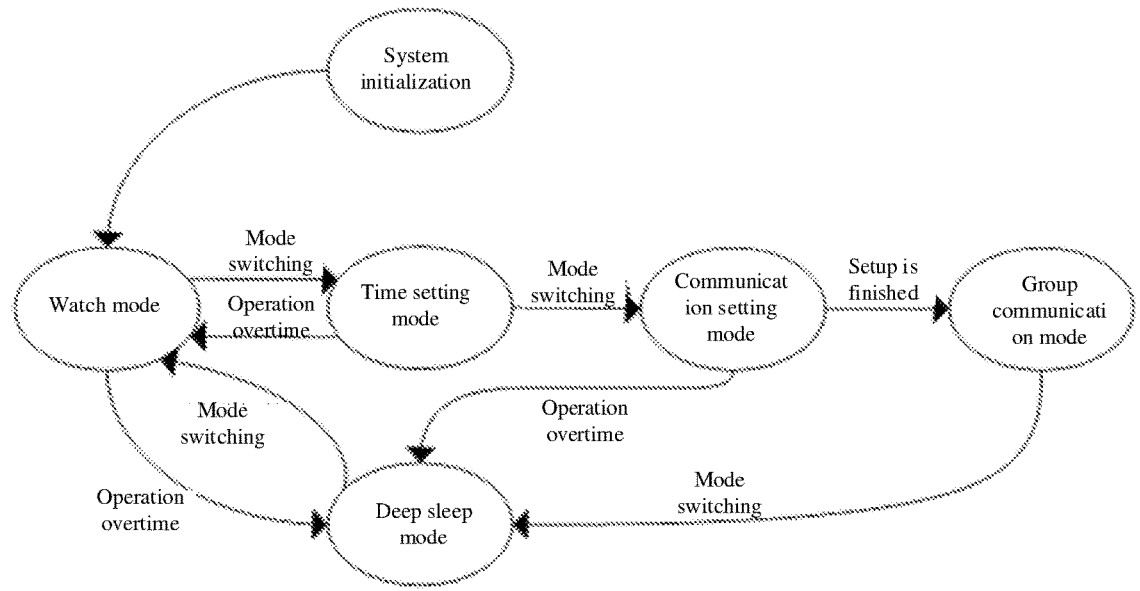
FIG. 13 is a schematic diagram of operating mode switching of an embodiment of a communication apparatus according to the present disclosure.

In some embodiments, FIG. 10 shows an appearance structure of the wearable device, and FIG. 11 shows a cross-sectional view of the wearable device. The housing 50 of the wearable device is designed in a rectangular shape and adopts the all-in-one design by using high-strength ABS engineering plastic, the strength is high, the weight is light, the area is small, the thickness is thin, and the children are also suitable for wearing. As shown in FIG. 11, the entire structure is stacked in three layers, and from top to bottom are an OLED display screen (display unit 41), the circuit board 70, and a 303450 ultra-thin lithium ion battery (battery unit 60). The external interface includes a Micro USB interface 61 on the left side of the dial for conveniently charging the lithium ion battery, and an operating mode switch button 52, which enables the wearable device to switch among a normal operating mode, a deep sleep mode, and a communication mode, wherein the normal operating mode includes a watch working mode and a clock setting mode, and switching among various operating mode states is shown in FIG. 13. There are three buttons on the right side of the dial: a character select button 53 is used to select the character of the to-be-joined group name in the communication mode and to select the time number in the clock setting mode, an audio output control button 55 is for controlling the audio is outputted via the speaker or the headphone; a confirm key 54 is used to confirm the character selected by the character select button when the wearable device is in the setup mode. Other structures include a speaker output aperture 58, a headphone output aperture 57, a microphone input aperture 56, a reset aperture (a small aperture in the lower left corner of the dial in FIG. 10), and the like. When the wearable device is a smart watch, the wearable device further comprises a watch strap 59, and the strap 59 may further be provided with a vent hole 591 to increase comfort. Optionally, the display unit 41 may further divide the display area, wherein the area 411 is used to display the date, the area 412 is used to display the time or display the corresponding content in other modes, or is used to display the received text information, the area 413 is used to display a battery level.

In some embodiments, the wearable device further comprises an operating mode switch button 52 disposed on the housing 50 and a switching circuit (not shown) disposed on the circuit board 70, the operating mode switch button 52 is connected to the control unit 10 through the switch circuit; a switching signal generated by the operating mode switch button 52 is transmitted to the control unit 10 through the switching circuit, and the control unit 10 controls the wearable device to switch among a normal operating mode, a deep sleep mode, and a communication mode based on the switching signal.

In some embodiments, the wearable device further comprises a real-time clock unit 90 for displaying time information on the display unit 41 when the wearable device is in the deep sleep mode.

Optionally, the real-time clock unit 90 is an RTC (Real-Time Clock).

Figure 12:
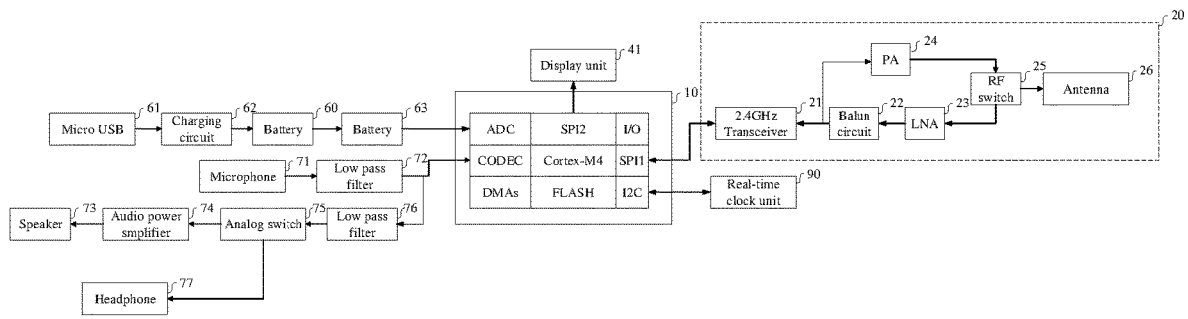
FIG. 12 is a schematic diagram showing the internal circuit hardware structure of an embodiment of the communication apparatus shown in FIG. 10.

FIG. 12 shows an overall hardware schematic block diagram of the wearable device.

In some embodiments, referring to FIG. 12, the microphone 71 is used to convert the speech signal into an electrical signal, and audio out-of-band noise is filtered out by the first-order RC low-pass filter 72 to improve the signal-to-noise ratio of the audio signal. The control unit 10 may, for example, select a Nuvoton Cortex-M4 core high performance audio processor NU505, which includes a hardware floating point multiplier and a divider.

In some embodiments, a Nuvoton Cortex-M4 core high performance audio processor NU505 is used in the control unit of the wearable device, and the control unit includes an audio codec CODEC, and the encoder digitizes a mono microphone analog audio into a 24-bit linear code, and the decoder converts the received 24-bit linear code into an analog audio electrical signal.

In some embodiments, the control unit further includes a DMA (Direct Memory Access) channel for high speed transmission of audio data between the memory and the codec.

In some embodiments, the control unit further includes an SPI1 interface, an SPI2 interface, and a control display unit 41, wherein the SPI1 interface is used for controlling and performing data interaction with the 2.4 GHz transceiver 21.

In some embodiments, the control unit further includes a timer to provide a timing reference for high precision timing operations during system operation, such as timing for switching of the system among various operating modes.

In some embodiments, the control unit further includes an ADC (Analog-to-Digital Converter) for performing power detection on the lithium ion battery by the power detecting circuit 63; FLASH (flash memory), in addition to curing system program, it also stores English alphabet and numeric fonts, established group communication names, as well as other system setting parameters.

In some embodiments, the control unit further includes an audio power amplifier 74 for power-amplifying the analog audio recovered by the decoder and driving the speaker 73 to make sound.

In some embodiments, the control unit further includes an earphone 77, and the audio signal recovered by the decoder can also be outputted from the earphone.

In some embodiments, the control unit further includes an analog switch 75 for controlling whether the decoder output audio is outputted from the headphone 77 or from the speaker 73, it is connected to the control unit 10 via the first-order RC low pass filter 76.

In some embodiments, the control unit further includes a rechargeable lithium ion battery 60, a system operating power source.

In some embodiments, the control unit further includes a charging circuit 62 that can charge the lithium ion battery 60 when an external DC power adapter is connected.

In some embodiments, the control unit further includes a 2.4 GHz transceiver 21 that effectuates inter-conversion between the baseband digital signal and the radio frequency signal.

In some embodiments, the control unit further includes an LNA (Low Noise Amplifier) 23, that is, used for extracting, amplifying, and extracting a weak audio modulated signal in the received RF signal, and filtering out the out-of-band noise of the modulated signal; it is connected to the 2.4 GHz transceiver 21 via a balun circuit (balanced-unbalanced transformer) 22.

In some embodiments, the control unit further includes a PA (Power Amplifier) 24 that further amplifies the 0 dBm RF signal outputted by the 2.4 GHz transceiver 21 to 20 dBm, thereby substantially raising the wireless communication distance.

In some embodiments, the control unit further includes a radio frequency switch 25 for switching a transceiving operating state of the radio frequency signal, that is, the power amplifier PA is connected when the signal needs to be transmitted, and the low noise amplifier LNA is connected when the signal is required to be received.

In some embodiments, the control unit further includes an antenna 26, which adopts a 2.4G high-gain omnidirectional ceramic antenna to greatly reduce a volume and facilitate structural design under the premise of ensuring signal quality.

In some embodiments, the control unit further includes a real-time clock unit 90. Although the Nuvo NU505 internally includes an RTC, RTC is also turned off once it enters the deep sleep state, for being capable of still timing even if the system is in a deep sleep, herein, an external RTC (Real-Time Clock) is used separately.

In some embodiments, the control unit further includes a display unit 41, a Blu-ray 1.5" OLED display may be selected for displaying the current time (year, month, day, hour, minute, and second), the system operating state, because the screen is relatively large power consumption source in the entire system, its power supply is realized by the control unit 10 controls the MOSFET (Metal-Oxide Semiconductor Field Effect Transistor), so as to greatly reduce the overall power consumption of the system while in the sleep state.

In some embodiments, the control unit further includes various buttons, the utility of which includes: manually switching the system operating state; setting or modifying the current time; setting the group communication name, and the like.

In addition to the communication functions mentioned in the foregoing communication apparatus embodiments, in some embodiments, the operating mode and switching state of the wearable device is as shown in FIG. 13.

After the wearable device is powered on, system initialization (including audio codec format, sampling rate, 2.4G wireless transceiver physical layer communication rate, etc.) is first performed, and then the control unit 10 reads the current time from the RTC through the I2C bus and displays the time in digital form on the display unit 41, thereafter the control unit 10 will acquire and display the time in the RTC interruption mode (1 second frequency). If no operation is performed after 10 seconds, the system automatically enters the deep sleep state, and the display unit 41 is turned off, the control unit 10 enters a low-power operating mode, and only the RTC in the entire system is in an operating state (its operating current is only uA level). It needs to press the operating mode switch button 52, then the system enters the watch mode from the deep sleep state.

After the wearable device switches to the watch mode, the action is only the display unit 41 displays the current time and the current battery power. If the operating mode switch button 52 is pressed again at this time, the time setting mode is entered, and the user can sequentially modify the values of year, month, day, hour, minute, and second by the character select button and the confirm button, thus realizing the manual time modification. After the setting is completed, the wearable device automatically enters the watch mode.

If the operating mode switch button 52 is pressed again in the time setting mode, the wearable device enters the communication setting mode, that is, determining the group communication name (similar to the SSID of the Wi-Fi hotspot, all communication devices joining the group communication must use the same group communication name), herein, a group list is first presented, including options of previously established groups and newly established groups. The already-established group name can be used directly or deleted. If a new group name is created, the display unit 41 will pop up a character selection menu composed of 26 English letters, 10 Arabic numerals, a case switch key, a delete key, and a confirm key, and the user can enter, modify, and finalize the group name of the group communication to join by the character select button 53 and the confirm button 54. After the communication setup is completed, the wearable device enters the group communication mode.

In the communication mode, the on-chip peripherals such as the audio codec CODEC, DMA channel, ADC, etc. in the control unit 10 start to work, the external display unit 41, the 2.4 GHz transceiver 21, the PA (power amplifier), the LNA (low noise amplifier) and so on also start to work, so the whole machine consumes a lot of power, the device can simultaneously perform full-duplex group voice communication with for example up to 7 other terminals.

The process of transmitting and receiving voice information by the wearable device will be described below with reference to FIG. 12.

The voice information transmitting process of each communication device in the group network is: the wearable device will always filter the analog audio acquired by the microphone 71 and digitize it using the audio codec CODEC inside the control unit 10, and then transmit it by DMA to the internal transmitting queue for buffering (using a message queue data structure, similar to FIFO), once its transmission time slot arrives, the control unit 10 begins to fetch 24 bits (3 bytes) of audio sample data from the audio buffering queue and follow the G.711 A rate compression standard to compress the 24-bit linear code into an 8-bit compressed code (in fact, the program block has actually made an A-rate compression table to maximize data processing performance) to reduce the wireless data bandwidth, and all compressed audio data is stored in another segment of the transmitting queue for buffering, is then transmitted to the signal transceiving unit 20 for transmission by DMA.

The voice information receiving process of each communication device in the group network is: the signal transceiving unit 20 of the wearable device receives wireless audio data sent by other communication devices at the time than its own transmission time slot and generates an interrupt, and the control unit 10 acquires the packet size and sets the DMA controller to buffer the wireless audio data of each terminal in the group to the receiving queue (each terminal corresponds to one receiving queue), then the control unit 10 receives the minimum audio packet size, exerts a superimposition operation on all terminal audio data (implementing audio synchronization), 8-bit compressed code is converted into 24-bit linear code and stored in a new buffering queue, and finally the DMA controller is used to send the superimposed audio data to the audio codec module to be restored as analog voice signals to be outputted. The user can use the audio control buttons to control the audio to be outputted through the speaker or headphone.

The terminal wireless signal transmitting or receiving state is implemented by the control unit 10 controlling the radio frequency switch 25. The switch is switched to the PA (power amplifier) and to be connected with the antenna only when the audio signal needs to be transmitted; otherwise, it is in a receiving state, that is, the high frequency switch is switched to the LNA (Low Noise Amplifier) to be connected with the antenna. At this point, all terminals in the group are communicated with each other, that is, all terminals can simultaneously transmit wireless voice signals, there will be no collision in the air (or the collision probability is extremely low), and all other terminals can receive them.

It can be seen from the above embodiments that the wearable device provided by the embodiment of the present disclosure has the functions of a conventional wearable device, its greatest feature is that it supports full duplex voice communication of up to 8 people in a certain range (500 meters), overcomes that the traditional interphone only supports half-duplex voice call; in addition, the open ISM 2.4 GHz frequency band of the device does not incur any cost during use; the system structure is simple, low cost, low power consumption; small size and light weight, easy to carry, with a good user experience and a wide range of usage scenarios.

The wearable device provided by the embodiment of the present disclosure can has above functions in the communication apparatus of the present disclosure. Specifically, it supports full-duplex communication among multiple people by means of time division multiplexing, which can avoid or reduce to a large extent the air collision phenomenon of multiple channels of wireless signals. Compared with the half-duplex (such as interphone) supporting only a group of two persons, it has a wider range of applications; at the same time, unlike communication terminals such as mobile phones, use of the wearable device causes no cost in communication, because it uses the open ISM 2.4 GHz frequency band without relying on the carrier network, and does not generate communication fee or traffic charge; in addition, the interphone needs to manually switch the communication channel when interference or conflict occurs during a call, so as to continue to talk, and the master device in the wearable device supports channel listen-in and carrier collision detection, and manages other communication devices (slave devices) in the target group to switch to the designated frequency point to continue communication when co-channel interference is generated, thereby improving the anti-interference ability of the group communication system, it is more "smart" than the interphone, and is more convenient for users, especially the elderly and children.

Figure 14:
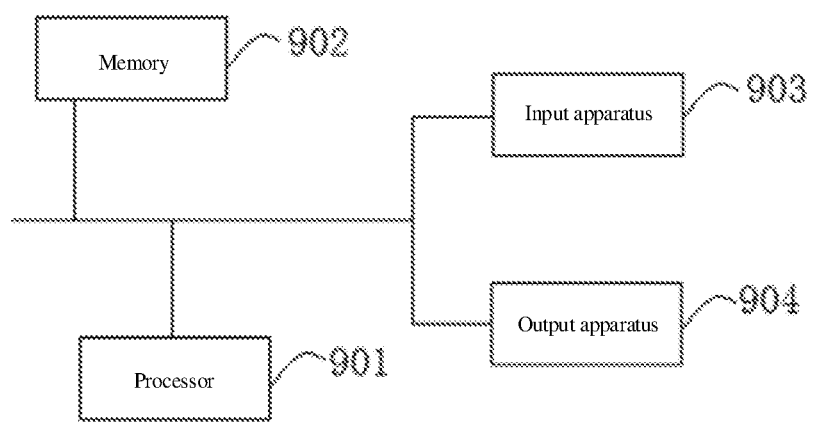
FIG. 14 is a schematic structural diagram of an embodiment of an electronic device according to the present disclosure.

Based on the above objective, in a third aspect of the embodiments of the present disclosure, an embodiment of an electric device that executes the communication method is provided. FIG. 14 is a schematic diagram showing the hardware structure of an embodiment of an electric device for performing the communication method provided by the present disclosure.

As shown in FIG. 14, the electric device comprises: one or more processors 901 and a memory 902, one processor 901 is taken as an example in FIG. 14.

wherein the memory stores instructions executable by the at least one processor, execution of the instructions by the at least one processor enables the electronic device to perform an operation, including: constructing a target group, wherein the target group comprises the communication device and at least one other communication device, and each communication device in the target group sequentially transmits a message on a communication frequency point of the target group; determining a priority of the communication device in the target group, and determining a transmission time slot corresponding to the priority according to the priority; transmitting a data message in the transmission time slot, and receiving a data message at a time other than the transmission time slot.

In some embodiments, constructing the target group includes: determining whether the target group has been established by listening-in, during a preset listening-in time period, on a preset frequency point; if the target group has not been established, establishing the target group on a first target frequency point; if the target group has been established, determining a second target frequency point on which the target group has been established, and joining the target group.

In some embodiments, determining the priority of the communication device in the target group, and determining the transmission time slot corresponding to the priority include: comparing the first parameter and the second parameter; determining the priority of the communication device in the target group according to a comparison result; determining the transmission time slot based on the priority.

In some embodiments, transmitting the data message in the transmission time slot includes: obtaining a to-be-transmitted data information; transmitting the to-be-transmitted data information to a transmitting queue; extracting a data information of a preset length from the transmitting queue and transmitting the data information of the preset length in the transmission time slot.

In some embodiments, the electric device for executing the communication method further comprises an input apparatus 903 and an output apparatus 904. The processor 901, the memory 902, the input apparatus 903, and the output apparatus 904 may be connected by a bus or in other manner, and the bus connection is taken as an example in FIG. 14.

The memory 902 is a non-volatile computer-readable storage medium, and is usable for storing non-volatile software programs, non-volatile computer-executable programs, and modules, such as the program instructions/modules (for example, the control unit 10, the signal transceiving unit 20, the data obtaining unit 30, and the data output unit 40 shown in FIG. 9) corresponding to the communication method in the embodiment of the present disclosure. The processor 901 executes various functional applications of the server and data processing by executing non-volatile software programs, instructions, and modules stored in the memory 902, that is, implementing the communication method in the above-described method embodiments.

The memory 902 may include a storage program area and a storage data area, wherein the storage program area may store an operating system, an application required for at least one function; the storage data area may store data created according to usage of the electric device, and the like. Moreover, the memory 902 may include high speed random access memory, and may also include non-volatile memory, such as at least one magnetic disk storage device, flash memory device, or other non-volatile solid state storage device. In some embodiments, the memory 902 may optionally include a memory remotely located relative to the processor 901 and capable of being connected to a member user behavior monitoring device over a network. Examples of such networks include, but not limited to, the Internet, intranets, local area networks, mobile communication networks, and combinations thereof.

The input apparatus 903 may receive input numeric or character information and generate key signal inputs related to user settings and function control of the electric device. The output apparatus 904 may include a display device such as a display screen.

The one or more modules are stored in the memory 902, and when executed by the one or more processors 901, execute the communication method in any of the above method embodiments and has the functions of the above communication apparatus.

In a fourth aspect of the embodiments of the present disclosure, there is provided a computer-readable storage medium storing a computer program, wherein the computer program, when executed by a processor, implements: constructing a target group, wherein the target group includes the communication device and at least one other communication device, and each communication device in the target group sequentially transmits a message on a communication frequency point of the target group; determining a priority of the communication device in the target group, and determining a transmission time slot corresponding to the priority according to the priority; transmitting a data message in the transmission time slot, and receiving a data message at a time other than the transmission time slot.

In some embodiments, constructing the target group includes: determining whether the target group has been established by listening-in, during a preset listening-in time period, on a preset frequency point; if the target group has not been established, establishing the target group on a first target frequency point; if the target group has been established, determining a second target frequency point on which the target group has been established, and joining the target group.

Last, it should be noted that, those skilled in the art may understand that all or a part of the process of the method in the foregoing embodiment may be implemented by a computer program instructing relevant hardware. The program may be stored in a computer-readable storage medium. When being executed, the program may include the processes of the foregoing method embodiments. The storage medium may be a magnetic disk, a compact disk, a read-only memory (ROM), or a random access memory (RAM), and so on. The technical effect of the embodiments of the computer program is the same as or similar to any of the foregoing method embodiments.

In addition, typically, the devices, apparatus, and the like described in the present disclosure may be various electronic communication devices, such as mobile phones, personal digital assistants (PDAs), tablet computers (PADs), smart televisions, etc., or large communication devices, such as servers and the like, thus the protection scope of the present disclosure should not be limited to a particular type of device or apparatus. The client terminal described in the present disclosure may be applied to any of the above-described electronic communication devices in forms of electronic hardware, computer software, or a combination of both.

Further, the method according to the present disclosure may be also implemented in a CPU-executable computer program, the computer program may be stored in a computer-readable storage medium. When executed by CPU, the computer program performs the functions described above according to the embodiments of the present disclosure.

Further, the procedures of the methods and the system units described above may also be implemented by using a controller and a computer-readable memory medium storing computer programs that enable the controller to realize the above procedures or unit functions.

Further, it should be understood that the computer-readable storage device (for example, memory) described herein may be a volatile memory or a non-volatile memory or may include both of them. As examples without limitation, the non-volatile memory may include a read only memory (ROM), a programmable read only memory (PROM), an erasable programmable read only memory (EPROM), an electrically erasable programmable read only memory (EEPROM) or a flash memory. The volatile memory may include a random access memory (RAM), which may be used as an external high speed buffer memory. As examples without limitation, RAM may be obtained in various forms, such as synchronous RAM (SRAM), dynamic RAM (DRAM), synchronous dynamic RAM (SDRAM), double data rate SDRAM (DDR SDRAM), enhanced SDRAM (ESDRAM), synchronous link DRAM (SLDRAM), or direct Rambus RAM (DRRAM). The memory device according to aspects of the present disclosure are intended to include, but not limited to, these and other suitable types of memory.

It should be understood to those skilled in the art that the exemplary logic blocks, modules, circuits and algorithms described in conjunction with the present disclosure may be implemented in hardware, software, or a combination of both. For the purpose of explaining the interchangeability between hardware and software, the functions and roles of the exemplary components, blocks, modules, circuits and procedures are described generally. Whether a particular function is implemented in software or hardware depends on the specific application and the design constraints of the overall system. Those skilled in the art may have a variety of ways to implement the described functions pertaining to specific applications, but such implementation decisions should not be interpreted as causing a departure from the scope of the present disclosure.

Various illustrative logical blocks, modules and circuits described in conjunction with the present disclosure may be implemented or performed by the following components that are designed to perform the above functions: a general purpose processor, a digital signal processor (DSP), a dedicated integrated circuit (ASIC), a field programmable gate array (FPGA) or other programmable logic devices, discrete gates or transistor logics, discrete hardware components or any combination of these components. The general purpose processor may be a microprocessor. Alternatively, the processor may be any one of a conventional processor, a controller, a microcontroller or a state machine. The processor may be implemented as a combination of computing devices, such as a combination of a DSP and a microprocessor, a plurality of microprocessors, one or more microprocessors in conjunction with a DSP core, or any other such configuration.

The method and steps of the algorithm described in conjunction with the present disclosure may be directly contained in hardware, in a software module executed by a processor or in combination of the both. The software may reside in a RAM memory, a flash memory, a ROM memory, an EPROM memory, an EEPROM memory, a register, a hard disk, a removable disk, a CD-ROM, or any other storage medium known in the art. An exemplary storage medium is coupled to the processor such the processor can read information from the storage medium or write information thereto. In an alternative embodiment, the storage medium may be integrated with the processor. The processor and the storage medium may reside in an ASIC which may reside in a user terminal. In an alternative embodiment, the processor and the storage medium may reside in a user terminal as discrete components.

In one or more exemplary designs, the above functions may be implemented in hardware, software, firmware or any combination thereof. If implemented in software, the above functions may be stored in a computer-readable medium as one or more instructions or codes, or transmitted through the computer-readable medium. The computer-readable medium includes computer storage medium and communication medium. The communication medium includes any medium that may be used to transmit computer programs from one location to another location. The storage medium may be any available medium that is accessible by a general or special computer. For example, but without limitation, the computer-readable medium may include a RAM, a ROM, an EEPROM, a CD-ROM or other CD storage devices, disk storage device or other magnetic storage devices, or any other medium that may be used to carry or store the required program codes in a form of instructions or data structure and may be accessible by a general or special computer or a general or special processor. In addition, any connection may be appropriately called as a computer-readable medium. For example, if a coaxial cable, a fiber optic cable, a twisted pair, a digital subscriber line (DSL) or wireless technologies such as infrared rays, radio and microwave are used to transmit software from a website, a server or other remote source, the above coaxial cable, the fiber optic cable, the twisted pair, the DSL or wireless technologies such as infrared rays, radio and microwave are all within the definition of the medium. As used herein, the disk and the optical disk includes a compression disk (CD), a laser disc, an optical disk, a digital versatile disc (DVD), a floppy disks and a blue-ray disk, wherein the magnetic disk normally represents data magnetically, and the optical disk represents data optically by utilizing a laser. The combination of the above should also be included in the scope of the computer-readable medium.

Although the above embodiments of the present disclosure are disclosed exemplary embodiments, it should be noticed that, various alterations and modifications may be made without departing the scope of the present disclosure, which is defined by the claims. The functions, steps and/or operations of the method claims according to the described embodiments of the present disclosure, may not necessarily be performed in a particular order. In addition, although the element of the present disclosure is described or prescribed in a single form, it may be multiple-form, unless it is explicitly prescribed as a single form.

It is to be understood that the singular forms "a","an", "the" are intended to include the plural forms unless it is explicitly otherwise specified. It should also be understood that "and/or" as used herein is meant to include any and all possible combinations of one or more of the associated listed items.

The serial numbers of the above embodiments in the present disclosure are only for depiction, but not for showing the superiority and inferiority of the embodiments.

Those of ordinary skill in the art could understand that all or part of the steps for realizing the above embodiments may be completed by hardware, or by a program instructing relevant hardware to complete, the program may be stored in a computer-readable storage medium, and the above mentioned storage medium may be a read only storage, a magnetic or an optical disk.

It should be understood by those of ordinary skill in the art that the discussion of any of the above embodiments is merely exemplary, and is not intended to suggest that the scope of the present disclosure (including the claims) is limited to these examples; the technical features in the examples or in the different embodiments may also be combined, and there are many other variations of the various aspects of the embodiments of the present disclosure as described above, which are not provided in the details for the sake of brevity. Therefore, any omissions, modifications, equivalents, improvements, etc. that are made within the spirit and scope of the embodiments of the present disclosure are intended to be included within the scope of the present disclosure.

What is claimed is:

1. A communication method for a communication device, comprising:
   constructing a target group, wherein the target group comprises the communication device and at least one other communication device, and each communication device in the target group sequentially transmits a message on a communication frequency point of the target group;
   determining a priority of the communication device in the target group, and determining a transmission time slot corresponding to the priority according to the priority;
   transmitting a data message in the transmission time slot, and receiving a data message at a time other than the transmission time slot;
   wherein the method further comprising:
   determining, according to the priority, one communication device in the target group as a master device, and determining other communication devices in the target group other than the master device as slave devices; and wherein an expression for determining the transmission time slot corresponding to the priority according to the priority is:

$$t_r = \frac{b_A * T_s}{b_P} + \frac{n * T_s}{m},$$

wherein $t_r$ is a moment at which the data message of the master device is received, $T_s$ is a communication cycle; $b_A$ is a data encoding rate; $b_P$ is an air interface data transmission rate; $n$ is the priority of the communication device, and $m$ is the preset number of terminals in the target group.

2. The communication method according to claim 1, wherein constructing the target group comprises:
   determining whether the target group has been established by listening-in, during a preset listening-in time period, on a preset frequency point;
   if the target group has not been established, establishing the target group on a first target frequency point;
   if the target group has been established, determining a second target frequency point on which the target group has been established, and joining the target group.

3. The method according to claim 2, wherein the first target frequency point and/or the second target frequency point are in an ISM 2.4 GHz frequency band.

4. The method according to claim 2, wherein establishing the target group comprises:
   determining the first target frequency point;
   transmitting, on the first target frequency point, a first group message at a preset time interval, wherein the first group message comprises a first group information and a first parameter, the first parameter is related to the priority;
   receiving, on the first target frequency point, at least one second group message, wherein the second group message comprises a second group information and a second parameter, the second parameter is related to the priority.

5. The communication method according to claim 2, wherein joining the target group comprises:
   determining whether a number of existing communication devices in the target group reaches a preset number of terminals;
   if the number of the existing communication devices in the target group does not reach the preset number of terminals, joining the target group.

6. The communication method according to claim 4, wherein the first group information comprises an identifier of the target group; the second group information comprises an identifier of the target group and a device address of a communication device subordinate to the target group.

7. The communication method according to claim 4, wherein determining the priority of the communication device in the target group, and determining the transmission time slot corresponding to the priority comprise:
   comparing the first parameter and the second parameter;
   determining the priority of the communication device in the target group according to a comparison result;
   determining the transmission time slot based on the priority.

8. The communication method according to claim 5, wherein determining the priority of the communication device in the target group, and determining the transmission time slot corresponding to the priority according to the priority comprise:
   setting the priority of the communication device to be lower than the priority of other communication devices in the target group;
   determining the transmission time slot based on the priority.

9. The communication method according to claim 1, wherein transmitting the data message in the transmission time slot comprises:
   obtaining a to-be-transmitted data information;
   transmitting the to-be-transmitted data information to a transmitting queue;
   extracting a data information of a preset length from the transmitting queue and transmitting the data information of the preset length in the transmission time slot.

10. The communication method according to claim 1, wherein receiving the data message at a time other than the transmission time slot comprises:
- receiving a data information from other communication devices in the target group;
- buffering the data information from other communication devices in the target group to a receiving queue corresponding to a respective communication device;
- exerting a superimposing operation on all the data information and storing the superimposed data information in an output buffering queue;
- sequentially outputting the superimposed data information.

11. The communication method according to claim 1, wherein if the communication device is the master device, the communication method further comprises:
- calculating a group communication success rate according to the data message transmitted and received in the target group, the data message including a third parameter indicative of a quantity of successful data reception;
- if the group communication success rate is lower than a preset communication success rate threshold, transmitting a frequency hopping message in the target group, the frequency hopping message comprising a frequency hopping point;
- receiving a frequency hopping response message from other communication devices in the target group;
- if the frequency hopping response message of each of all the other communication devices in the target group has been received, stopping the transmission of the frequency hopping message and switching to the frequency hopping point.

12. The communication method according to claim 1, wherein if the communication device is the slave device, the communication method further comprises:
- receiving a frequency hopping message indicative of a frequency hopping point from the master device;
- transmitting a frequency hopping response message;
- switching to the frequency hopping point.

13. An electronic device, comprising:
- at least one processor; and
- a memory, which is communicatively coupled to the at least one processor, wherein the memory stores instructions executable by the at least one processor, execution of the instructions by the at least one processor enables the electronic device to perform an operation, comprising:
- constructing a target group, wherein the target group comprises the communication device and at least one other communication device, and each communication device in the target group sequentially transmits a message on a communication frequency point of the target group;
- determining a priority of the communication device in the target group, and determining a transmission time slot corresponding to the priority according to the priority;
- transmitting a data message in the transmission time slot, and receiving a data message at a time other than the transmission time slot;
- wherein the method further comprising: determining, according to the priority, one communication device in the target group as a master device, and determining other communication devices in the target group other than the master device as slave devices; and wherein an expression for determining the transmission time slot corresponding to the priority according to the priority is:

$$t_r - \frac{b_A * T_s}{b_P} + \frac{n * T_s}{m},$$

wherein $t_r$ is a moment at which the data message of the master device is received, $T_s$ is a communication cycle; $b_A$ is a data encoding rate; $b_P$ is an air interface data transmission rate; n is the priority of the communication device, and m is the preset number of terminals in the target group.

14. The electronic device according to claim 13, wherein constructing the target group comprises:
- determining whether the target group has been established by listening-in, during a preset listening-in time period, on a preset frequency point;
- if the target group has not been established, establishing the target group on a first target frequency point;
- if the target group has been established, determining a second target frequency point on which the target group has been established, and joining the target group.

15. The electronic device according to claim 13, wherein transmitting the data message in the transmission time slot comprises:
- obtaining a to-be-transmitted data information;
- transmitting the to-be-transmitted data information to a transmitting queue;
- extracting a data information of a preset length from the transmitting queue and transmitting the data information of the preset length in the transmission time slot.

16. A non-transitory computer-readable storage medium storing a computer program, wherein the computer program, when executed by a processor, implements:
- constructing a target group, wherein the target group comprises the communication device and at least one other communication device, and each communication device in the target group sequentially transmits a message on a communication frequency point of the target group;
- determining a priority of the communication device in the target group, and determining a transmission time slot corresponding to the priority according to the priority;
- transmitting a data message in the transmission time slot, and receiving a data message at a time other than the transmission time slot;
- wherein the method further comprising: determining, according to the priority, one communication device in the target group as a master device, and determining other communication devices in the target group other than the master device as slave devices; and wherein an expression for determining the transmission time slot corresponding to the priority according to the priority is:

$$t_r - \frac{b_A * T_s}{b_P} + \frac{n * T_s}{m},$$

wherein $t_r$ is a moment at which the data message of the master device is received, $T_s$ is a communication cycle; $b_A$ is a data encoding rate; $b_P$ is an air interface data transmission rate; n is the priority of the communication device, and m is the preset number of terminals in the target group.

17. The non-transitory computer-readable storage medium according to claim 16, wherein constructing the target group comprises:
determining whether the target group has been established by listening-in, during a preset listening-in time period, on a preset frequency point;
if the target group has not been established, establishing the target group on a first target frequency point;
if the target group has been established, determining a second target frequency point on which the target group has been established, and joining the target group.

18. The electronic device according to claim 14, wherein establishing the target group comprises:
determining the first target frequency point;
transmitting, on the first target frequency point, a first group message at a preset time interval, wherein the first group message comprises a first group information and a first parameter, the first parameter is related to the priority;
receiving, on the first target frequency point, at least one second group message, wherein the second group message comprises a second group information and a second parameter, the second parameter is related to the priority.

19. The electronic device according to claim 18, wherein determining the priority of the communication device in the target group, and determining the transmission time slot corresponding to the priority comprise:
comparing the first parameter and the second parameter;
determining the priority of the communication device in the target group according to a comparison result;
determining the transmission time slot based on the priority.

* * * * *